H. A. W. WOOD.
PASTING DEVICE FOR WEB PRESSES.
APPLICATION FILED APR. 9, 1915. RENEWED OCT. 8, 1920.
1,378,304.
Patented May 17, 1921.
2 SHEETS—SHEET 1.
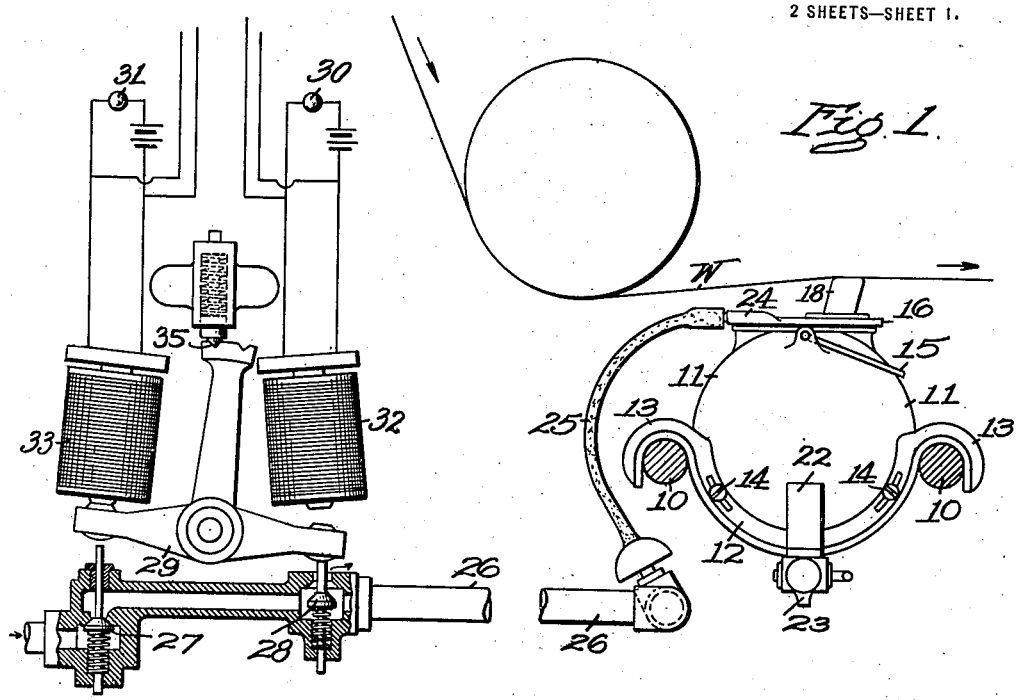

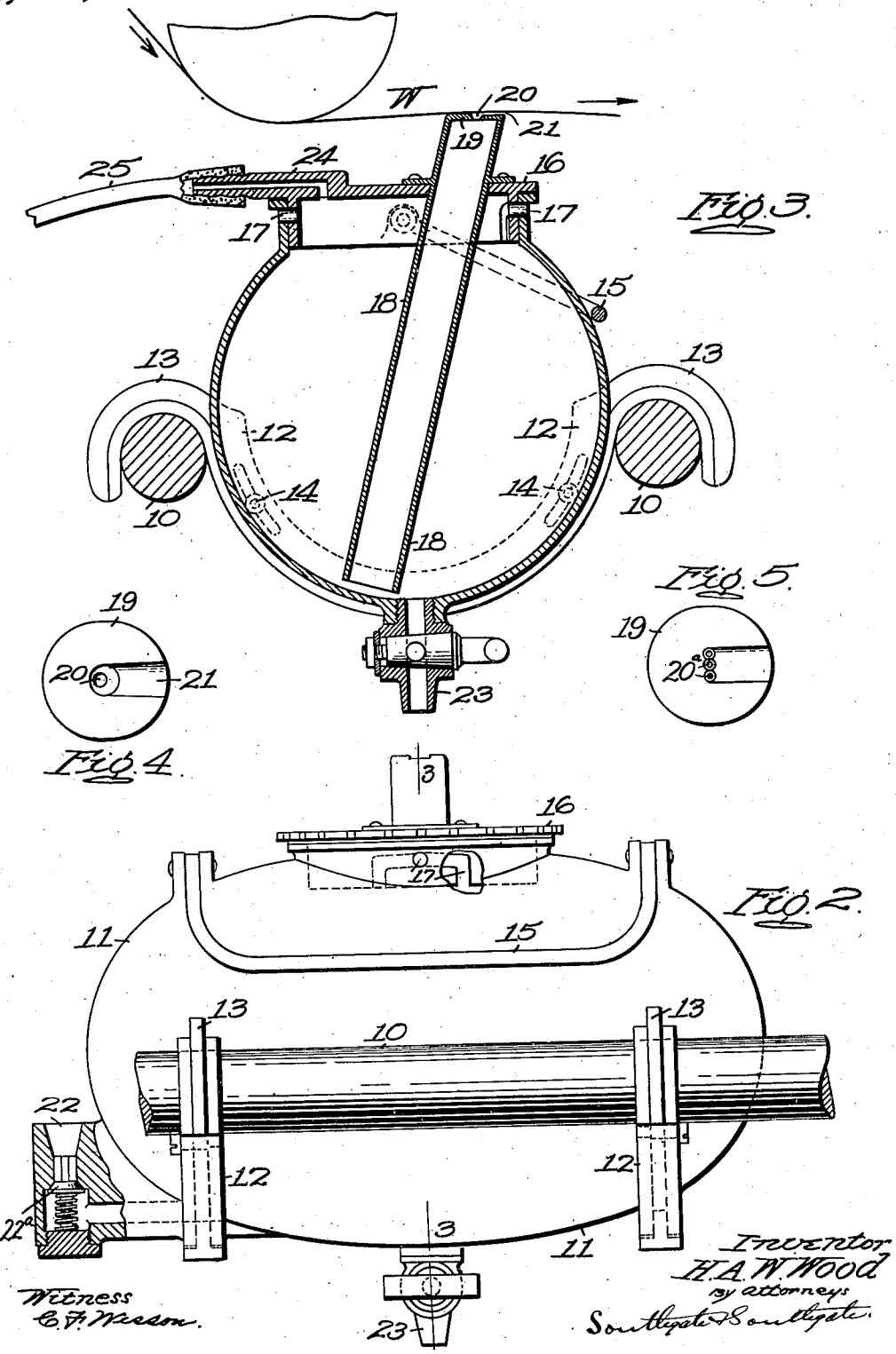

UNITED STATES PATENT OFFICE.

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA.

PASTING DEVICE FOR WEB-PRESSES.

1,378,304.   Specification of Letters Patent.   Patented May 17, 1921.

Application filed April 9, 1915, Serial No. 20,348. Renewed October 8, 1920. Serial No. 415,677.

*To all whom it may concern:*

Be it known that I, HENRY A. WISE WOOD, a citizen of the United States, residing at New York, in the county of New York and State of New York, have invented a new and useful Pasting Device for Web-Presses, of which the following is a specification.

This invention relates to a pasting device for use in connection with a web press.

The principal objects of the invention are to provide a simplified and continuously operating means for applying paste along a margin of the web; to provide a construction which can be operated without danger of scattering the paste, especially when working at high speed; also to provide simple and effective means whereby the paste is applied in a uniform and safe manner and is slightly spread out in a uniform width on the web; means whereby the paste can be forced on the web by pneumatic pressure; means whereby the paste receptacle can readily be applied to the press and removed therefrom; and means whereby the operation of applying the paste to the web will be started when the press is started, and stopped when it is stopped. The invention also involves improvements in the mechanism for accomplishing these results.

Reference is to be had to the accompanying drawings in which,

Figure 1 is a side elevation, partly diagrammatic and partly in section, of a preferred embodiment of this invention as applied to a web press;

Fig. 2 is an elevation of the paste container with parts in section;

Fig. 3 is a central sectional view of the same on the line 3—3 of Fig. 2;

Fig. 4 is a plan of the nozzle;

Fig. 5 is a plan of a modified form of nozzle, and

Fig. 6 is a perspective view of a modified form of pasting device.

Ordinarily, web presses are provided with pasting devices in which a rotating disk is used. The lower edge of this disk is immersed in a fountain of paste and the other edge applies the paste to the web from a groove in the periphery in which the paste is carried. A scraper has to be employed to keep its sides and edge clean so as to furnish an even line of paste. This is a very troublesome device because it occupies a great deal of room an account of the disk, and the fountain has to be located in between two webs. It also requires a rotating mechanism and is liable to throw the paste off the edge of the disk on account of the centrifugal force, especially when the press is speeded up beyond the ordinary speed.

This invention is designed to obviate these difficulties and especially to permit of the running of the press at a high rate of speed without danger of throwing off any paste.

Referring first to the first four figures, it will be understood that although the details of the press are not illustrated herein, yet the device is intended for use on a web press and that this press constitutes the means for feeding the web referred to herein. On the frame of this press are shown a pair of transverse rods 10 for supporting the paste receptacle or container 11. This container is carried on the rods by means of two circumferentially adjustable carriers 12 which have ears 13 extending over these rods and supported thereon.

The container 11 is provided with flanges 14 to which the carriers 12 are fixed in adjusted position by means of screws 14 or the like. This container is shown as provided with a bail 15 by which it may be carried and also lifted in and out of position on the rods 10. It is also provided with a cover 16 which is secured by a bayonet lock 17 in airtight condition on the top of the container. Through the cover passes a paste tube 18 which has a flange by which it is secured thereto. It is open at the bottom and is provided with a horizontal flat surface 19 at the top, parallel with the direction of the web W, and substantially in contact therewith. This surface is provided with a perforation 20, preferably substantially at the center thereof. This perforation is made small to permit of the paste being forced through to form a small thread or stream, as will appear. From this perforation a shallow channel 21 extends to the edge of the surface 19, running in the same direction as the web and slanting upwardly toward the edge of this surface. This is provided for the purpose of smoothing out and thinning the strip of paste applied to the web.

In the form shown in Fig. 5, a plurality of perforations 20ᵃ are shown. The perforations 20 or 20ᵃ constitute nozzles for the extrusion of the paste.

The container can be filled with paste under pressure by applying a tube or nozzle to a filling nozzle 22, which will depress the valve 22ᵃ to admit the paste. A discharge nozzle 23 is also shown.

The cover is provided with a projection 24 for connecting an air hose 25 therewith. This hose is connected with a pipe 26 supplied with compressed air from any desirable source and having an inlet valve 27 and an exhaust valve 28. These valves are seated by springs.

For the purpose of controlling these valves, a lever 29 is provided, one end being adapted to engage and depress the stem of the valve 28 and the other the stem of the valve 27 in the two extreme positions of the lever. For the purpose of operating this lever, so as to control the operation of the device upon the starting and stopping of the press, the starting button 30 and the stopping button 31 are provided in addition to their other connections, with circuits for energizing electro-magnets 32 and 33, respectively. When the electro-magnet 33 is energized by the pushing of the stop button 31, the lever 28 is moved to the position shown in Fig. 1 and the exhaust valve 27 is depressed and opened. At this time the inlet valve is allowed to close by its spring. When the starting button is pushed, the opposite condition takes place. A spring pawl 35 is shown for yieldingly holding the lever in either extreme position.

The operation of the device is as follows. The container is simply dropped into position on the rods 10 and connected up in the manner indicated. Upon the pressing of the starting button, the valve 27 is opened and the valve 28 closed so that air pressure is admitted to the paste receptacle. At this time, of course, the press starts and the paste is forced through the tube 18 and nozzle opening 20 against the surface of the web W as the latter travels. The passage of the paste along the channel 21 spreads it and smooths it so as to get a line of paste on the web, of uniform width and thickness. The pressing of the stopping button will relieve the interior of the container of the air pressure and stop the flow of paste immediately. Thus the paste will not be blown out when no web is running, as in case of a paper break, or when the web is being threaded in the press.

This apparatus requires very little room, as it can be made to fit the available space. It is inexpensive because it has no moving parts. It will work efficiently, regardless of speed because of the elimination of the element of centrifugal force.

In the form shown in Fig. 6, a simplified arrangement is indicated in which the nozzle 19ᵇ is provided with a pipe connection 40 which has branches 41. Each of these is adapted to be connected with a tube 42 which extends into a paste can 43. A coupling 44 is shown for detachably connecting these parts.

The pipe sections 41 immediately above these couplings are provided with ball checks 45 to prevent leakage of paste when the cans are removed. These cans are connected with the air pipe line 46 by sections of hose 47 or the like, detachably connected with the cans. The cans are shown as supported on a tray 48 and the tube 40 as being carried by a suitable brace 49 on the frame of the press.

The especial advantage of this construction is the simplicity and the means whereby a continuous supply of paste can be furnished while the machine is running, without having to stop the press if one of the cans has to be removed. When this is done, the stop cock 50 connected to that can is shut, that hose 47 disconnected from the can, and the coupling 44 on that side opened. The check valve immediately closes this connection and the paste continues to flow from the other can.

Although I have illustrated and described only two embodiments of the invention, I am aware of the fact that many modifications can be made therein by any person skilled in the art without departing from the scope of the invention as expressed in the claims. Therefore, I do not wish to be limited to the details of construction herein shown and described, but what I do claim is:—

1. A nozzle for the purpose described, having a plurality of small perforations arranged in a row, and a single shallow wider slanting channel extending transversely from the row of perforations.

2. The combination with a web press, of means for extruding a stream of plastic paste against the surface of the web during the travel of the web, and means for automatically stopping the stream of paste when the press is stopped.

3. The combination with a web press, of a paste container having a nozzle through which paste can be forced against the web, means for conducting air into said receptacle for forcing the paste out, said air-conducting means being provided with an air inlet valve and an exhaust valve, and means whereby upon the stoppage of the press, the inlet valve will be allowed to close and the exhaust valve open.

4. The combination with a web press, of a paste container having a nozzle through which paste can be forced against the web, pneumatic means for forcing the paste out, said pneumatic means being provided with an air inlet valve and an exhaust valve, said exhaust valve being located between the inlet valve and the container, a starting device and a stopping device for controlling the operation of the press, means operated by said starting device for opening said inlet valve and closing the exhaust valve, and means operated by the stopping device for opening the exhaust valve and closing the inlet valve.

5. The combination with a web press, a paste container, an air pipe connected therewith, and a nozzle for discharging the paste on the web, of inlet and exhaust valves for said pipe, a lever adapted to turn to two positions in one of which it opens the exhaust valve and in the other of which it opens the inlet valve, and springs for normally closing each valve when not operated upon by the lever.

6. The combination with a web press, a paste container, an air pipe connected therewith, and a nozzle for discharging the paste on the web, of inlet and exhaust valves for said pipe, a lever adapted to turn to two positions, in one of which it opens the exhaust valve and in the other of which it opens the inlet valve, springs for normally closing each valve when not operated upon by the lever, two electro-magnets, one having means for moving the lever to one position and the other means for moving the lever to the other position, a starting button for controlling one electro-magnet, and a stopping button for controlling the other electro-magnet.

7. The combination with a web press, of a paste container having a nozzle through which paste can be forced against the web, pneumatic means for forcing the paste out, said pneumatic means being provided with an air exhaust valve, a starting device and a stopping device for controlling the operation of the press, means operated by said starting device for closing the exhaust valve, and means operated by the stopping device for opening the exhaust valve.

8. The combination with a web press, of a paste container having a nozzle through which paste can be forced against the web, means for conducting air into said receptacle for forcing the paste out, said air-conducting means being provided with an air inlet valve, and means whereby upon the stoppage of the press the valve will be allowed to close.

9. In a device for applying paste to a web while under the control of a web press, the combination of means for extruding a stream of plastic paste against the surface of the web while the web is in motion, and means whereby the feed of the paste is stopped simultaneously with the stopping of the movement of the web.

10. The combination with the frame of a web press, of a paste container supported thereby and having a nozzle through which paste can be forced against the web, means for conducting air into said receptacle for forcing the paste out, and means whereby upon the stoppage of the press, the flow of air into the receptacle will be allowed to stop.

In testimony whereof I have hereunto set my hand, in the presence of a subscribing witness.

HENRY A. WISE WOOD.

Witness:
BLODWEN W. JONES.